United States Patent
Lamb

(10) Patent No.: US 7,445,202 B2
(45) Date of Patent: Nov. 4, 2008

(54) SHIELD ASSEMBLY FOR A VEHICLE SUSPENSION

(75) Inventor: Julian Lamb, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 442 days.

(21) Appl. No.: 11/271,722

(22) Filed: Nov. 11, 2005

(65) Prior Publication Data

US 2006/0108761 A1 May 25, 2006

Related U.S. Application Data

(60) Provisional application No. 60/627,052, filed on Nov. 12, 2004.

(51) Int. Cl.
*F16F 9/04* (2006.01)
(52) U.S. Cl. ..................... 267/179; 267/220
(58) Field of Classification Search ............. 280/124.1, 280/124.139; 267/210, 220, 221, 33, 34, 267/64.24, 179
See application file for complete search history.

(56) References Cited

U.S. PATENT DOCUMENTS

| | | | |
|---|---|---|---|
| 2,170,114 A * | 8/1939 | Busch | 188/226.1 |
| 2,803,453 A * | 8/1957 | Settles | 267/210 |
| 2,927,786 A * | 3/1960 | Templeton | 267/220 |
| 3,195,918 A * | 7/1965 | Poole | 280/124.139 |
| 3,596,895 A * | 8/1971 | Hirtreiter | 267/64.24 |
| 3,606,446 A * | 9/1971 | Leslie | 296/208 |
| 4,256,292 A | 3/1981 | Sullivan, Jr. et al. | |
| 4,433,856 A | 2/1984 | Yoshida | |
| 4,491,340 A | 1/1985 | Von Grunberg et al. | |
| 4,771,996 A | 9/1988 | Martinez, Jr. et al. | |
| 4,822,072 A | 4/1989 | Preslicka et al. | |
| 4,881,752 A | 11/1989 | Tanaka | |
| 4,886,256 A | 12/1989 | Nishiyama et al. | |
| 4,934,667 A | 6/1990 | Pees et al. | |
| 4,969,542 A | 11/1990 | Athmer et al. | |
| 4,986,566 A | 1/1991 | Nishino et al. | |
| 5,275,389 A | 1/1994 | Pinch et al. | |
| 5,584,368 A | 12/1996 | Larsson | |
| 5,678,808 A | 10/1997 | Claude et al. | |
| 6,325,187 B1 | 12/2001 | Boucher | |
| 6,446,944 B1 | 9/2002 | Ward | |
| 6,640,943 B1 | 11/2003 | Daws et al. | |
| 6,749,047 B2 | 6/2004 | Koyano et al. | |
| 2003/0218286 A1 | 11/2003 | Miyazaki et al. | |
| 2004/0079602 A1 | 4/2004 | Verriet | |

* cited by examiner

*Primary Examiner*—Christopher P Schwartz
(74) *Attorney, Agent, or Firm*—Mark Duell; Michael A. Forhan; Eley Law Firm Co.

(57) ABSTRACT

A shield assembly for a vehicle suspension. The shield assembly comprises a first shield portion attached to a lower arm of the suspension and a second shield portion attached to a lower spring seat of the suspension and at least partially surrounding the first shield portion. The first and second shield cooperate to deflect foreign objects proximate the suspension. A method employs the shield assembly.

26 Claims, 6 Drawing Sheets

SHIELD ASSEMBLY FOR A VEHICLE SUSPENSION

This application claims priority to U.S. provisional application 60/627,052, filed Nov. 12, 2004, the contents of which are hereby incorporated by reference.

FIELD

The present invention relates generally to vehicle suspensions and, more particularly, to a shield assembly adapted to deflect foreign objects proximate the suspension.

BACKGROUND

Vehicle suspension systems provide isolation from rough or uneven terrain and resistance to lateral roll of the vehicle's body during a turn. In a typical vehicle suspension system a combination of a coil spring and a damper provide reciprocating compressive movement of a wheel toward the vehicle and rebounding movement of the wheel toward the ground. The coil spring provides a suspending spring force that biases the wheel toward the ground and the damper provides a damping force that dampens both the suspending spring force and any impact force imparted by the road surface or hazards. The damper is typically a pressure type gas strut having a damper tube and a reciprocable piston rod. A lower spring seat is mounted to the damper tube and an upper spring seat is mounted to the piston rod. The coil spring extends between the lower spring seat and the upper spring seat.

In many suspension systems the damper tube is attached to a lower arm of the suspension and is pivotable relative to the lower arm. As a result, a pinch point may be formed between the lower spring seat and the lower arm. If material such as debris, rocks, ice, mud, snow, sludge and fluids (generally termed "foreign objects" herein) are trapped in this pinch point, the performance of the suspension system may be degraded. If the trapped materials are incompressible solids the damper tube and/or lower spring seat may be damaged when the damper tube pivots during operation of the suspension system.

Some current dampers include a single shield to guard against foreign objects, but such shields are effective only for deflecting large debris. Other dampers may include an elastomeric material proximate the spring seat, as indicated by U.S. Pat. No. 2,927,786, issued to Templeton, and U.S. Pat. No. 3,195,918, issued to Poole. Although the problem of foreign object incursion is not addressed in these patents, such a resilient material could be used to alter or reduce the area of the damper-mount pinch point to some degree. However, this is not an entirely satisfactory solution, since at least some portion of the pinch point would necessarily remain exposed in order for the damper tube to pivot properly. Some suspension systems include a spring guard to shield an automobile wheel from contact with a fractured portion of a strut spring, as in U.S. Pat. No. 4,822,072, issued to Preslicka, et al. A coil spring embedded in a protective material may also be utilized, as in U.S. Pat. No. 4,886,256, issued to Nishiyama, et al. Scrapers to remove ice from the piston rod of a shock absorber are also available, as exemplified by U.S. Pat. No. 5,584,368, issued to Larsson. A number of other shock absorbers include a dust cover or shield, such as U.S. Pat. App. Pub. No. 2003/0218286, filed by Miyazaki, et al. However, none of the available suspension systems and suspension components provide a satisfactory way to close off the aforementioned damper-mount pinch point and prevent ingress of foreign objects. The current art also fails to teach a way to close off the damper-mount pinch point that takes into account the constantly varying shape of the pinch point as the damper pivots during normal suspension operation, so as to keep foreign objects out of the pinch point. Thus, there is a need for a better way to resist entrapment of foreign objects within components of the suspension.

SUMMARY

The present invention is a shield assembly to deflect foreign objects proximate a vehicle suspension. A first shield portion is attached to the lower arm of the suspension. A second shield portion is attached to the damper tube and overlaps the first shield portion, substantially enclosing the pinch point and resisting ingress of foreign objects. The second shield portion pivots with the damper tube, maintaining a generally constant clearance between the first and second shield portions to keep foreign objects out of a pinch point formed by a lower spring seat and the lower arm.

An aspect of the present invention is a shield assembly for a vehicle suspension. The shield assembly comprises a first shield portion attached to a lower arm of the suspension and a second shield portion attached to a lower spring seat of the suspension and at least partially surrounding the first shield portion. The first and second shield cooperate to deflect foreign objects proximate the suspension.

Another aspect of the present invent is a method for deflecting foreign objects proximate a vehicle suspension. The method comprises the steps of attaching a first shield portion to a lower arm of the suspension and attaching a second shield portion to a lower spring seat of the suspension, positioned such that the second shield portion at least partially surrounds the first shield portion. The first and second shield portions cooperate to deflect the foreign objects.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
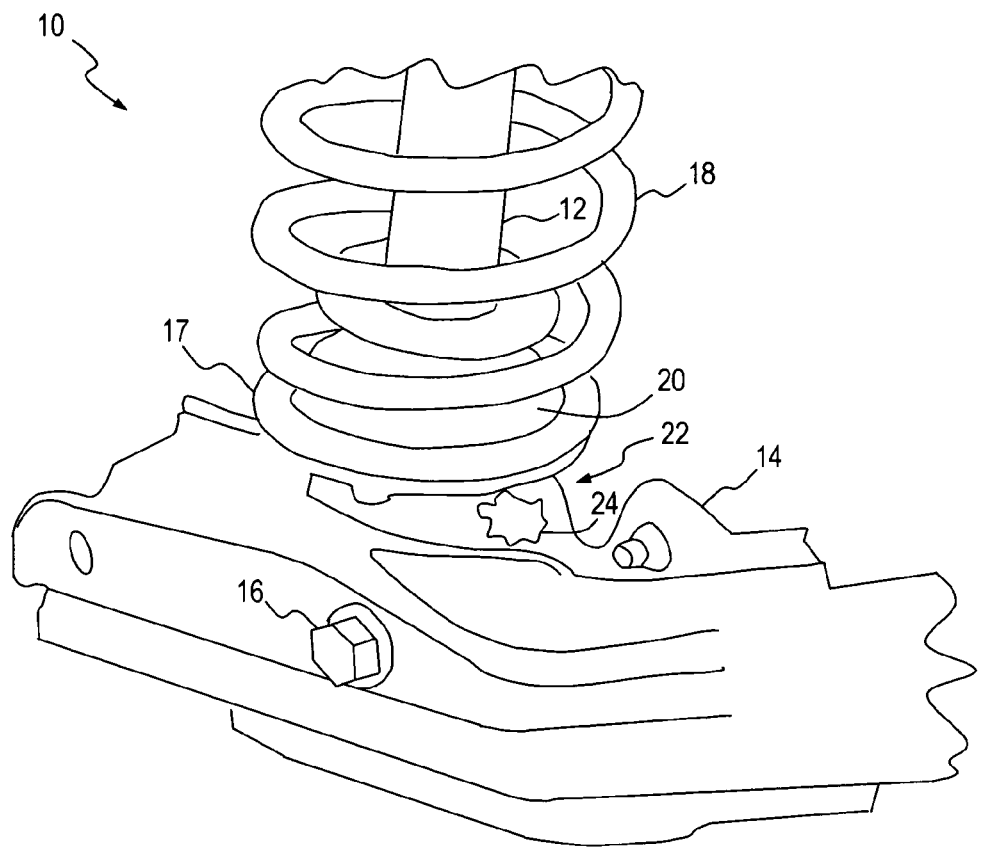
FIG. 1 is a perspective view of a typical prior art suspension system.
Figure 2:
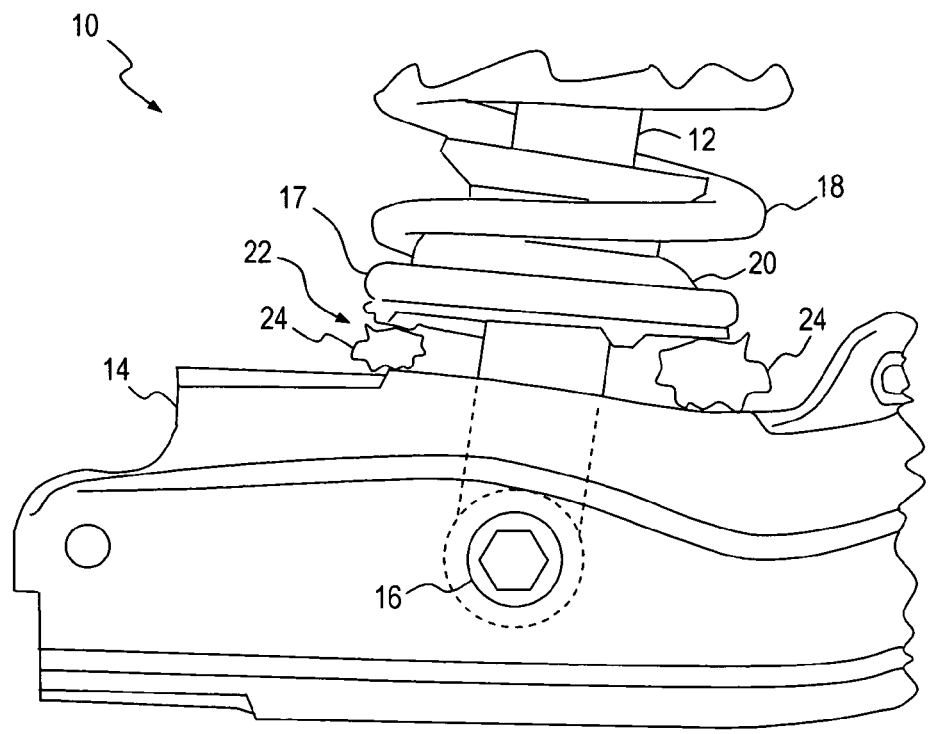
FIG. 2 is a side elevational view of the prior art suspension system of FIG. 1.

With reference to FIGS. 1 and 2, a relevant portion of a typical vehicle suspension system 10 is depicted. A damper tube 12 is pivotally attached to a lower arm 14 at an attachment point 16. An end 17 of a coil spring element 18 is coupled to a lower spring seat 20, which is in turn coupled to damper tube 12.

As can be seen, a pinch point 22 is formed by the gap between lower arm 14 and lower spring seat 20. Foreign objects 24, such as stones thrown up from the road by movement of the vehicle's wheels, may become lodged at pinch point 22. Likewise, foreign objects 24 such as fluids, mud, snow, sludge or ice may accumulate in pinch point 24 when the vehicle is driven in inclement weather. Foreign objects 24 degrade the performance of suspension 10 by impeding pivotal movement of damper tube 12 about attachment point 16. In some cases, if damper tube 12 pivots such that lower spring seat 20 pinches an incompressible foreign object 24 against lower arm 14 with sufficient force, damage to suspension components such as the lower spring seat, damper tube and lower arm may result.

Figure 3:
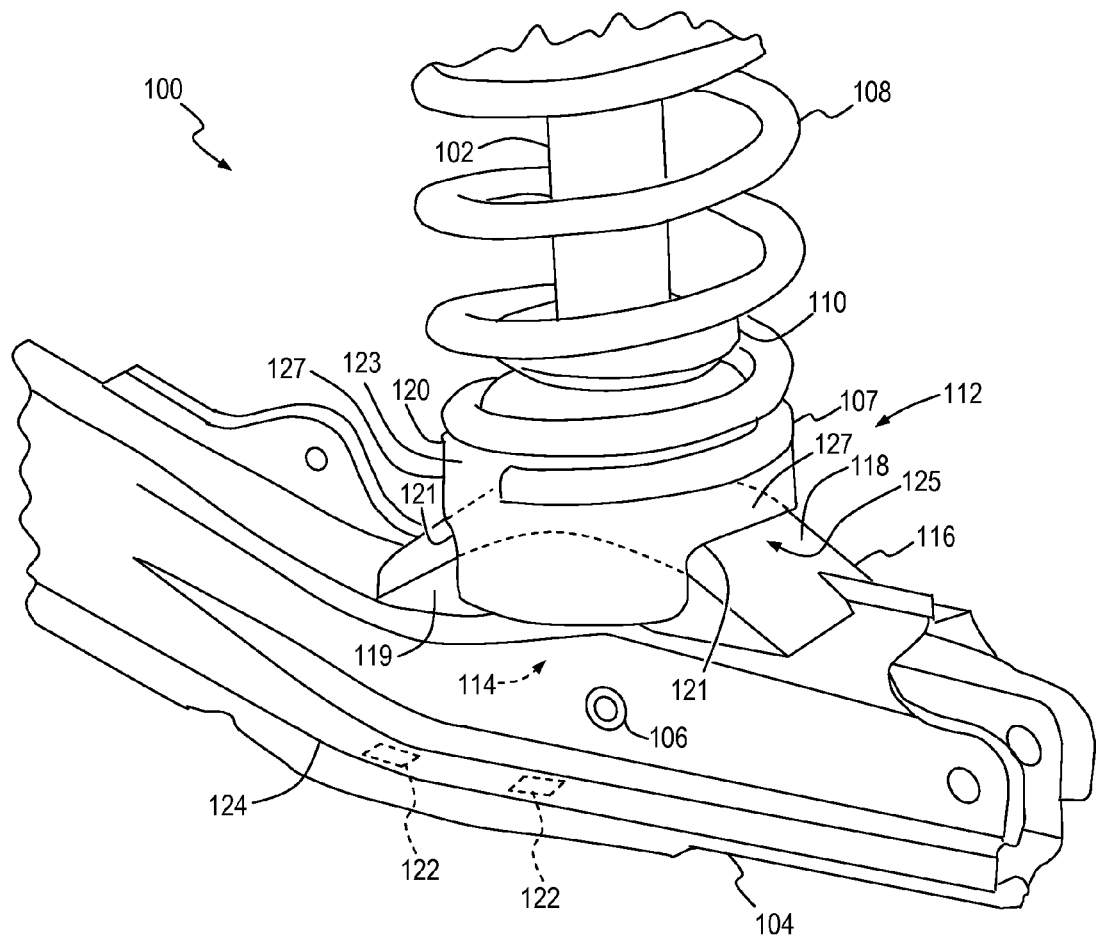
FIG. 3 is a perspective view of a shield assembly for a vehicle suspension according to an embodiment of the present invention.
Figure 4:
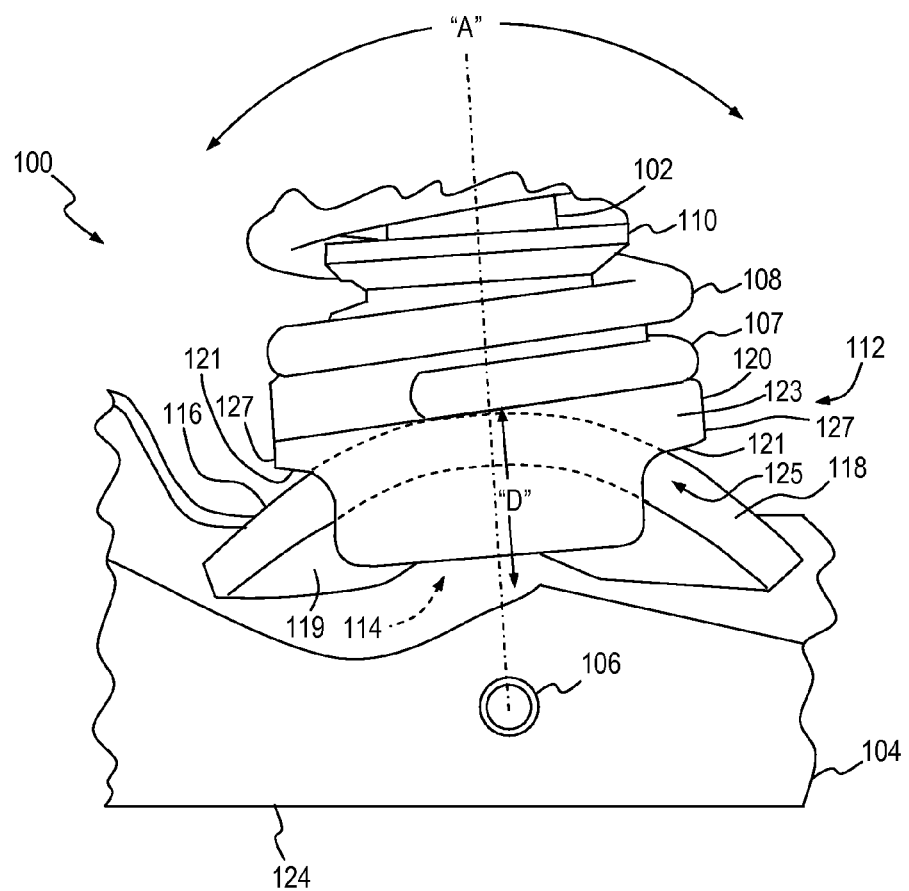
FIG. 4 is a side elevational view of the shield assembly of FIG. 3.

A relevant portion of a suspension system 100 is depicted in FIGS. 3 and 4 according to an embodiment of the present invention. A damper tube 102 is pivotally attached to a lower arm 104 at an attachment point 106. An end 107 of a coil spring element 108 is coupled to a lower spring seat 110, which is in turn coupled to damper tube 102.

Figure 5:
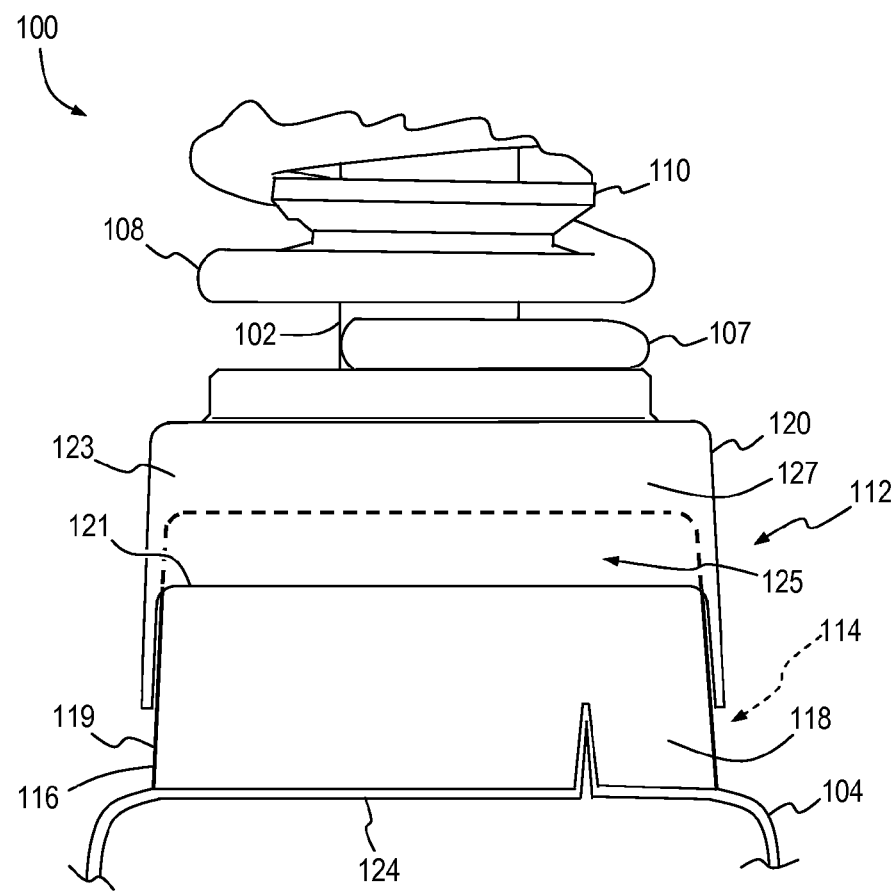
FIG. 5 is an end elevational view of the shield assembly of FIG. 3.

With reference now to FIGS. 3-5 in combination, a suspension shield assembly 112 according to an embodiment of the present invention encloses a pinch point 114 generally defined by lower spring seat 110 and lower arm 104. A first shield portion 116 of the shield assembly is attached to lower arm 104 and preferably includes a generally arcuate upper surface 118. A second shield portion 120 of the shield assembly is attached to lower spring seat 110 and is shaped to at least partially surround first shield portion 116. Second shield portion 120 is generally cup-shaped and includes a pair of aligned, spaced-apart apertures 121 formed in a generally cylindrical sidewall 123, the apertures together forming a slot 125 in the second shield portion.

In operation, first and second shield portions 116, 120 respectively of shield assembly 112 cooperate to substantially enclose pinch point 114 to deflect foreign objects proximate the pinch point. As the vehicle moves over terrain, damper tube 102 pivots about attach point 106 in an arc "A" (see FIG. 4) as suspension 100 acts to isolate the vehicle from the roughness of the road and to limit lateral roll of the vehicle body. Second shield portion 120, mounted to damper tube 102, likewise pivots about arcuate upper surface 118 such that pinch point 114 remains substantially enclosed despite the pivoting movement of the damper tube. First and second shield portions 116, 120 are thus positioned to cooperate to deter entrapment of foreign objects between lower spring seat 110 and lower arm 104, as well as deterring entrapment of foreign objects between damper tube 102 and the lower arm. In addition, suspension shield assembly 112 acts to reduce the accumulation of such foreign objects as fluids, mud, ice, sludge and snow proximate pinch point 114 by substantially isolating the pinch point from exposure to the elements.

With continued reference to FIGS. 3 and 4, in one embodiment of the present invention second shield portion 120 may be proximate to, or in contact with at least one of arcuate upper surface 118 and a pair of generally planar sidewalls 119 of first shield portion 116. In operation of suspension 100, as damper tube 102 pivots about attach point 106 in arc "A," confronting faces 127 of second shield portion 120 likewise move in an arc with respect to arcuate upper surface 118 of first shield portion 116, thereby providing a wiping action along the arcuate upper surface to sweep away foreign objects proximate shield assembly 112 and resist buildup of mud, sludge and ice.

With particular reference now to FIG. 3, the present invention may optionally include one or more openings 122 in a bottom wall 124 of lower arm 104 to discharge any foreign objects that penetrate suspension shield assembly 112 and enter pinch point 114, thereby preventing accumulation of foreign objects within the shield assembly. Openings 122 may be any convenient geometric shape and size, and may be located on bottom wall 124 at any point proximate pinch point 114 conducive to discharge of the trapped foreign objects.

Referring again to FIGS. 3 and 4, in another optional embodiment of the present invention lower spring seat 110 may be spaced apart from lower arm 104 by a predetermined distance "D" (see FIG. 4), providing greater clearance between the lower spring seat and the lower arm to further resist the buildup of foreign objects within the space proximate pinch point 114. Distance "D" may be determined on the basis of various criteria including, without limitation, the extent of travel of damper tube 102 about arc "A", the geometries of lower arm 104 and lower spring seat 110, empirical test data for both suspension 100 and the vehicle under varying environmental conditions, specifications for known road materials, and known physical properties for various fluids and solids normally encountered by the vehicle.

First and second shield portions 116, 120 respectively may be made of any conventional materials appropriate for the expected forces and environment of suspension 100 including, without limitation, metals, plastics, rubber compositions and composites. In one embodiment, either or both first and second shield portions 116, 120 may be made of resilient materials such as resilient plastic, natural rubber and synthetic rubber. Such resilient materials may in some instances be preferable for embodiments wherein second shield portion 120 engages first shield portion 116 with a wiping action as described above. In addition, the use of resilient materials for either or both of shield portions 116, 120 may allow accumulated sludge and ice to break away from shield assembly 112 as the shield portions will tend to flex during pivoting of damper tube 102 as suspension 100 operates. In other embodiments rigid materials such as rigid plastic, metal and composites are preferred for shield portions 116, 120 in order to break up and shed accumulated ice.

Figure 6:
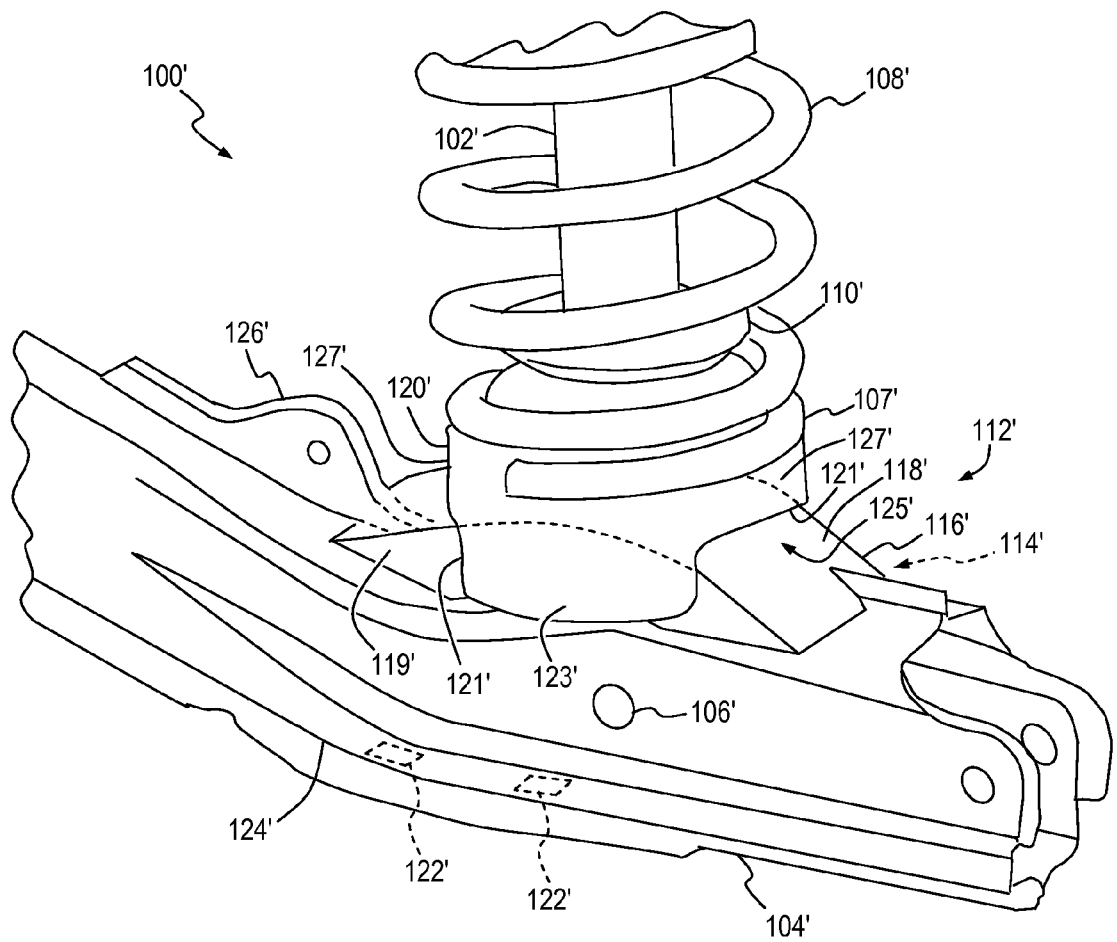
FIG. 6 is a perspective view of an alternate embodiment of the present invention.

It should also be noted that the size and shape of first and second shield portions 116, 120 is not critical and may be adjusted according to the geometries of a particular suspension 100. Accordingly, it may be desirable to shape shield portions 116, 120 so as to provide additional protection for suspension 100. For example, first shield portion 116 may be extended to other structures of the suspension in addition to the previously-described pinch point. An example of such an embodiment is shown in FIG. 6, wherein a first shield portion 116' extends proximate a stabilizer bracket 126' of a lower arm 104'. If a first shield portion 116' is made of a resilient material it will tend to flex during operation of suspension 100' due to interaction with second shield portion 120', thereby aiding to deter the accumulation of foreign objects in the region 114' between lower spring seat 110' and lower arm 104', extending to stabilizer bracket 126'. The structures defined by the remaining reference numerals depicted in FIG. 6 function in the manner previously discussed with regard to corresponding numerals in FIGS. 3 and 4.

While this invention has been shown and described with respect to a detailed embodiment thereof, it will be understood by those skilled in the art that changes in form and detail thereof may be made without departing from the scope of the claims of the invention.

What is claimed is:

1. A shield assembly for a vehicle suspension, comprising:
   a first shield portion configured to be attached to a lower arm of the suspension, the first shield portion having a pair of opposing, generally planar sidewalls and a generally arcuate upper surface; and
   a generally cup-shaped second shield portion configured to be attached to a lower spring seat of the suspension, the second shield portion including a pair of aligned, spaced-apart apertures formed in a generally cylindrical sidewall thereof, the apertures together forming a slot into which the first shield portion extends, wherein the first and second shield portions cooperate to deflect foreign objects proximate the suspension.

2. The shield assembly of claim 1 wherein the second shield portion pivots with respect to the first shield portion.

3. The shield assembly of claim 2 wherein confronting faces of the second shield portion move with respect to the arcuate upper surface of the first shield portion, thereby providing a wiping action along the arcuate upper surface.

4. The shield assembly of claim 1, further comprising
a lower arm of a vehicle suspension, the lower arm having a bottom wall; and
at least one opening in the bottom wall to direct trapped foreign objects away from the suspension.

5. The shield assembly of claim 1 wherein the first and second shield portions are positioned to deter entrapment of foreign objects proximate the lower spring seat and the lower arm.

6. The shield assembly of claim 1 wherein the first and second shield portions are positioned to deter entrapment of foreign objects proximate a damper tube of the suspension and the lower arm.

7. The shield assembly of claim 1 wherein the lower spring seat is spaced apart from the lower arm by a predetermined distance to resist the buildup of foreign objects within the space.

8. The shield assembly of claim 1 wherein at least one of the first and second shield portions is resilient.

9. The shield assembly of claim 1 wherein at least one of the first and second shield portions is rigid.

10. The shield assembly of claim 1 wherein the first shield portion extends proximate a stabilizer bracket of the suspension.

11. A shield assembly for a vehicle suspension, comprising:
a first shield portion configured to be attached to a lower arm of the suspension, the first shield portion having a pair of opposing, generally planar sidewalls and a generally arcuate upper surface; and
a generally cup-shaped second shield portion configured to be attached to a lower spring seat of the suspension, the second shield portion including a pair of aligned, spaced-apart apertures formed in a generally cylindrical sidewall thereof, the apertures together forming a slot into which the first shield portion extends, the second shield portion being adapted to pivot with respect to the first shield portion,
wherein confronting faces of the second shield portion move with respect to the arcuate upper surface of the first shield portion, thereby providing a wiping action along the arcuate upper surface to deflect foreign objects proximate the suspension, and
wherein the lower spring seat is spaced apart from the lower arm by a predetermined distance to resist the buildup of foreign objects within the space.

12. The shield assembly of claim 11, further comprising:
a lower arm of a vehicle suspension, the lower arm having a bottom wall; and
at least one opening in the bottom wall to direct trapped foreign objects away from the suspension.

13. The shield assembly of claim 11 wherein the first and second shield portions are positioned to deter entrapment of foreign objects proximate the lower spring seat and the lower arm.

14. The shield assembly of claim 11 wherein the first and second shield portions are positioned to deter entrapment of foreign objects proximate a damper tube of the suspension and the lower arm.

15. The shield assembly of claim 11 wherein at least one of the first and second shield portions is resilient.

16. The shield assembly of claim 11 wherein at least one of the first and second shield portions is rigid.

17. The shield assembly of claim 11 wherein the first shield portion extends proximate a stabilizer bracket of the suspension.

18. A method for deflecting foreign objects proximate a vehicle suspension, comprising the steps of:
attaching a first shield portion to a lower arm of the suspension, the first shield portion having a pair of opposing, generally planar sidewalls and a generally arcuate upper surface; and
attaching a generally cup-shaped second shield portion to a lower spring seat of the suspension, the second shield portion including a pair of aligned, spaced-apart apertures formed in a generally cylindrical sidewall thereof, the apertures together forming a slot into which the first shield portion extends,
wherein the first and second shield portions cooperate to deflect the foreign objects.

19. The method of claim 18, further comprising the step of adapting the second shield portion to pivot with respect to the first shield portion.

20. The method of claim 19, further comprising the step of providing the second shield portion with confronting faces that move with respect to the arcuate upper surface of the first shield portion, thereby providing a wiping action along the arcuate upper surface.

21. The method of claim 18, further comprising the step of forming at least one opening in a bottom wall of the lower arm to direct trapped foreign objects away from the suspension.

22. The method of claim 18, further comprising the step of spacing the lower spring seat apart from the lower arm by a predetermined distance to resist the buildup of foreign objects within the space.

23. The method of claim 18, further comprising the step of selecting a resilient material for at least one of the first and second shield portions.

24. The method of claim 18, further comprising the step of selecting a rigid material for at least one of the first and second shield portions.

25. The method of claim 18, further comprising the step of extending the first shield portion proximate a stabilizer bracket of the suspension.

26. A method for deflecting foreign objects proximate a vehicle suspension, comprising the steps of:
spacing a lower spring seat of the suspension apart from a lower arm of the suspension by a predetermined distance to resist the buildup of foreign objects within the space;
attaching a first shield portion to the lower arm, the first shield portion having a pair of opposing, generally planar sidewalls and a generally arcuate upper surface;
attaching a generally cup-shaped second shield portion to the lower spring seat, the second shield portion including a pair of aligned, spaced-apart apertures formed in a generally cylindrical sidewall thereof, the apertures together forming a slot into which the first shield portion extends; and
adapting the second shield portion to pivot with respect to the first shield portion such that confronting faces of the second shield portion move with respect to the arcuate upper surface of the first shield portion, thereby providing a wiping action along the arcuate upper surface to deflect the foreign objects.

* * * * *